(12) United States Patent
Li

(10) Patent No.: US 8,616,751 B2
(45) Date of Patent: Dec. 31, 2013

(54) LIGHT GUIDE FOR COUPLING DIFFERENTLY SHAPED LIGHT SOURCE AND RECEIVER

(75) Inventor: Wei Li, South Barrington, IL (US)

(73) Assignee: Excelitas Technologies Corp., Waltham, MA (US)

(*) Notice: Subject to any disclaimer, the term of this patent is extended or adjusted under 35 U.S.C. 154(b) by 223 days.

(21) Appl. No.: 13/045,111

(22) Filed: Mar. 10, 2011

(65) Prior Publication Data
US 2011/0222308 A1 Sep. 15, 2011

Related U.S. Application Data

(60) Provisional application No. 61/313,477, filed on Mar. 12, 2010.

(51) Int. Cl.
F21V 7/04 (2006.01)

(52) U.S. Cl.
USPC ........... 362/610; 362/600; 362/606; 362/608; 362/612; 362/555

(58) Field of Classification Search
USPC ............... 362/600, 606, 608, 610, 612, 616, 362/554–555, 558, 572–575, 249.02, 362/311.01–311.02; 313/600, 606, 608, 313/610, 612, 616, 554–555, 558, 572–575, 313/249.02, 311.01–311.02
See application file for complete search history.

(56) References Cited

U.S. PATENT DOCUMENTS

| | | | |
|---|---|---|---|
| 3,832,028 A * | 8/1974 | Kapron | 385/43 |
| 5,634,711 A | 6/1997 | Kennedy et al. | |
| 5,967,637 A | 10/1999 | Ishikawa et al. | |
| 6,272,269 B1 | 8/2001 | Naum et al. | |
| 6,290,382 B1 | 9/2001 | Bourn et al. | |
| 6,595,674 B1 * | 7/2003 | Yoneda | 362/555 |
| 6,692,431 B2 | 2/2004 | Kazakevich | |
| 6,826,336 B2 | 11/2004 | Guy | |
| 6,921,920 B2 | 7/2005 | Kazakevich | |
| 7,163,327 B2 | 1/2007 | Henson et al. | |
| 7,250,611 B2 | 7/2007 | Aguirre et al. | |
| 7,360,936 B2 * | 4/2008 | Abu-Ageel | 362/555 |
| 7,594,748 B2 * | 9/2009 | Chang et al. | 362/650 |
| 7,611,272 B2 * | 11/2009 | Specht et al. | 362/555 |
| 7,850,334 B2 * | 12/2010 | Holder et al. | 362/227 |
| 2007/0001613 A1 * | 1/2007 | Hulse | 313/634 |
| 2008/0137328 A1 * | 6/2008 | Lee et al. | 362/224 |
| 2009/0116260 A1 * | 5/2009 | Rovegno | 362/555 |
| 2009/0185392 A1 | 7/2009 | Krupa et al. | |
| 2010/0110719 A1 * | 5/2010 | Booth et al. | 362/554 |
| 2011/0085348 A1 * | 4/2011 | Dobson | 362/551 |
| 2012/0134131 A1 * | 5/2012 | Nakamura et al. | 362/2 |

FOREIGN PATENT DOCUMENTS

| | | |
|---|---|---|
| WO | 2002101289 A2 | 12/2002 |
| WO | 2005011012 A1 | 2/2005 |

* cited by examiner

Primary Examiner — Anne Hines
Assistant Examiner — Jose M Diaz
(74) Attorney, Agent, or Firm — Peter A. Nieves; Sheehan Phinney Bass + Green PA

(57) ABSTRACT

A light guide for interfacing between a light source having a light emitting surface with a first shape and a light receiver with a light receiving surface of a second shape. The light guide has a light emitting end having a first shape of substantially the same size as the first shape of the light emitting surface. A light receiving end has a second shape of substantially the same size as the second shape of the light receiving surface. A free form body between the light emitting end and the light receiving end causes a transition between the first and second shape.

22 Claims, 2 Drawing Sheets

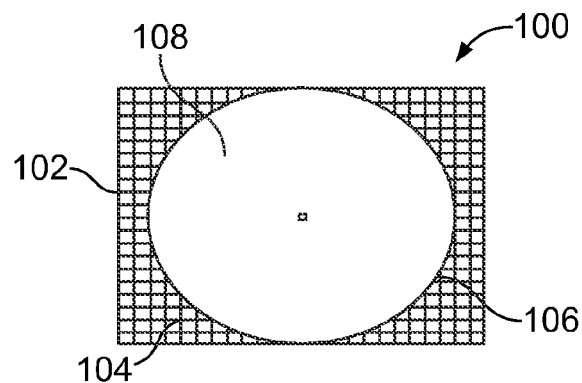
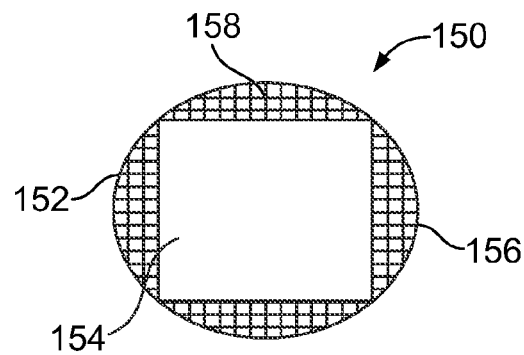
FIG. 1A  FIG. 1B
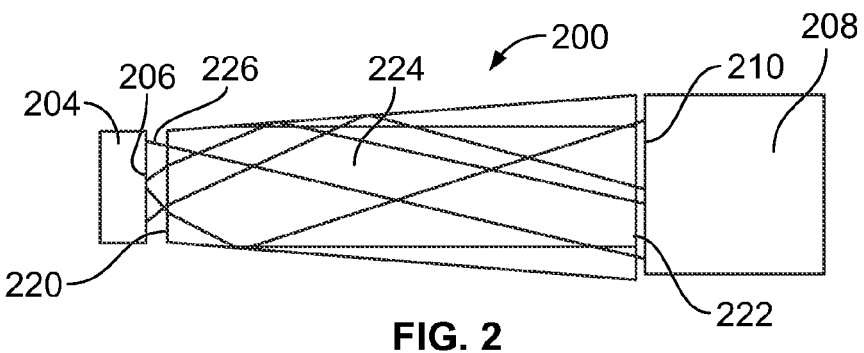
FIG. 2
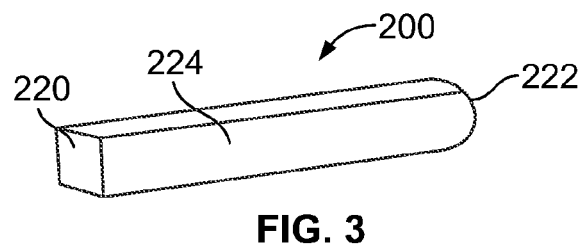
FIG. 3

LIGHT GUIDE FOR COUPLING DIFFERENTLY SHAPED LIGHT SOURCE AND RECEIVER

RELATED APPLICATIONS

This application claims priority to U.S. Provisional Application No. 61/313,477 filed Mar. 12, 2010, which is hereby incorporated by reference in their entirety.

FIELD OF TECHNOLOGY

The present invention relates to fiber optics, and more specifically to a light guide between differently shaped light source and light receivers.

BACKGROUND

Fiber-optic light sources are generally well known and are used in a broad range of applications. For example, in the medical field, fiber-optic illuminators such as various light sources, fiber-optics, and endoscopes are widely used in endoscopy. Bulb-based medical fiber sources are currently manufactured by Stryker, Smith-Nephew, Storz, Olympus, and others. Light sources and fiber-optics are commonly used for microscopy illumination, with lamp-based products offered by Zeiss, Welch-Allyn, Dolan-Jenner, and others. Fiber-optic illumination systems are also used with industrial boroscopes and machine vision systems. While the preceding devices primarily provide 'white' light for illumination, other fiber-optic light sources providing 'blue' light in the wavelength range 420-490 nm are used in photodynamic therapy for pediatric hyperbilirubinemia.

Systems having light sources and fiber-optics for light transmission can also provide one or more defined wavelengths of light for fluorescent excitation in biological and other research fields. For many applications, a round beam spot is desired, for example, an exam light, a spot light and a fiber optic light. In the case of a fiber optic light, the goal is to deliver more light through a fiber bundle. A fiber bundle is comprised of numerous fiber strands tightly packed together. All the fiber strands end at a cylindrical metal ferell. The fiber strands are then bound and polished. Light comes in from one end of the fiber bundle and is emitted out from the other end of the fiber bundle. When the fiber bundle end is round, the effective light transmission area is round. If the incoming light beam is from a rectangular or square shaped light source, depending on the size, only portion of the light is transmitted or portion of the fiber strands are utilized resulting in inefficiency.

For example, the emitting area inside an LED package is the footprint of the die or die cluster, which usually has a square or rectangular shape. When a lens system is used to collect light from LED(s), the output beam is the image of the LED die and is thus square or rectangular. This square or rectangular output beam therefore does not match the round fiber end and causes inefficiency because some light is lost in the transition. For many applications, it is desirable that the output light in a range of wavelength or color different than the source. Some manufacturers use additional filters to achieve that, increasing system complexity and cost. With the inventive light guide, filters can be integrated with the light guide by film deposition or color doping. The output beams currently use devices such as LEDs that are closely tied to the fiber optics. However, the shape of the LEDs still results in some inefficiencies. Another light guide is a thin plate for a surface light source that generates a highly uniform light. Such a light guide still creates inefficiencies as light is lost between the light source and the light guide.

SUMMARY

One disclosed example relates to a light guide for interfacing between a light source having a light emitting surface with a first shape and a light receiver with a light receiving surface of a second shape. The light guide has a light emitting end having a first shape of substantially the same size as the first shape of the light emitting surface. A light receiving end has a second shape of substantially the same size as the second shape of the light receiving surface. A free form body between the light emitting end and the light receiving end causes a transition between the first and second shape.

Another example is a method of producing a light guide to interface a light source having a light emitting surface having a first shape with a light receiver having a light receiving surface of a second shape. A light emitting end of the light guide having a first shape of substantially the same size as the first shape of the light emitting surface is formed. A light receiving end having a second shape of substantially the same size as the second shape of the light receiving surface is formed. A free form body connecting the light emitting end and the light receiving end having a shape transitioning between the first and second shape is formed.

Additional aspects will be apparent to those of ordinary skill in the art in view of the detailed description of various embodiments, which is made with reference to the drawings, a brief description of which is provided below.

BRIEF DESCRIPTION OF THE DRAWINGS

FIG. 1A is a perspective diagram of an example fiber optic interface involving a different shaped light source and receiver;

FIG. 1B is a perspective diagram of an example fiber optic interface involving a different shaped source and receiver;

FIG. 2 is a side view of a light guide that allows efficient light transmission between different shaped light source and receiver surfaces in FIGS. 1A-1B;

FIG. 3 is a perspective view of the light guide in FIG. 2;

Figure 4A:
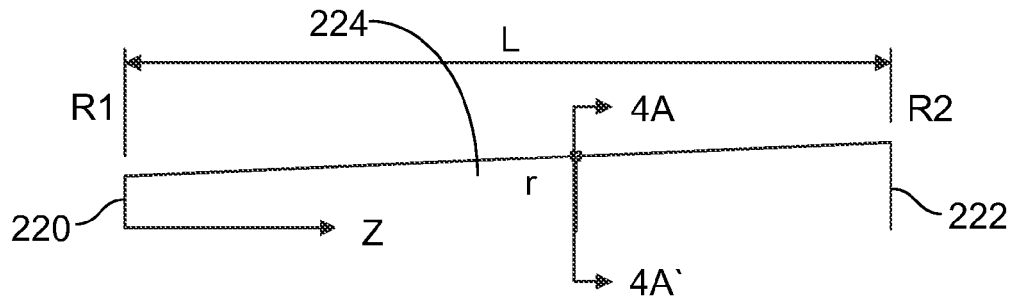
FIGS. 4A-4D are dimensional views of the various cross sections of the light guide in FIG. 2.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

FIG. 1A shows an example prior art fiber optic system 100 including an incoming light source 102 that includes a rectangular shaped light emitting surface 104. The rectangular shaped surface 104 may be a result of an LED package that is typically fabricated in a square or rectangular shape. The light is emitted from the light emitting surface 104 to a fiber bundle 106 via an interface surface 108 that is in a circular shape. Since the interface surface 108 at the end of the fiber bundle 106 is circular, the effective light transmission area is circular. If the incoming light beam is from a rectangular or square such as the light emitting surface 104, depending on the size, only portion of the light is transmitted or portion of the fiber strands are utilized resulting in inefficiency in light transmission. The grid sections of the light emitting surface 104 in FIG. 1A represent the portion of light that is not transmitted to the fiber bundle 106.

FIG. 1B shows another example prior art fiber optic system 150 that suffers from inefficiency in light transmission. The system 150 includes an incoming light source 152 that includes a rectangular shaped light emitting surface 154. The light from the light emitting surface is transmitted through a fiber bundle 156 that includes a circular end surface 158. In this example, the circular end surface 158 is larger in area than the square shaped light emitting surface 154 and therefore the fiber 154 is only partially illuminated by the light from the light source 152. The grid sections of the light emitting surface 158 in FIG. 1A represent the portion of the fiber optic bundle that is not illuminated by the light source 152.

FIG. 2 is a cross section view of a lighting system 200 including a light guide 202 according to the concepts described herein. FIG. 3 is a perspective view of the light guide 202. The light guide 202 in this example is inserted between a light source 204 that has a rectangular light emitting surface 206 and a light receiver such as a fiber optic bundle 208 that includes a circular receiving surface 210. The light guide 202 has a rectangular interface surface 220 on one end and a circular interface surface 222 on the opposite end. The light guide 202 is free formed and accepts light from the rectangular light emitting surface 206 of the light source 204 and outputs light in a circular shape to the circular receiving surface 210 of the light receiver 208. The rectangular shaped surface 220 and the circular shaped surface 222 are connected by a free formed surface 224 that transitions from a rectangular cross section to a circular cross section along its length. The light guide 208 can be a solid part of glass, quartz, polymeric material (plastic, silicones, etc) or fused fiber. Light enters the rectangular end surface 220 from the light source 204, bounces between the free formed surface 224 due to total internal reflection (TIR) and exits the circular end surface 222.

In this example, the light guide 202 is placed close to the light emitting surface 206, creating an air gap 226. Some light sources are LEDs having silicone filled domes or flat windows on the light emitting surface 206. When the light guide 202 is closer to the light source 204, more light can be collected and transmitted to the light receiver 208. The circular shaped surface 210 of the light receiver 208 can be placed directly against the light guide as shown in FIG. 2 or with a small air gap. Alternatively, the light receiver 208 may be absent so the circular surface 222 of the light guide 202 outputs light directly from the light source 204. Alternatively, the circular shaped surface 222 of the light guide 202 may be coupled to a lens or a reflector instead of the light receiver 208.

Either end surface 220 or 222 of the light guide 202 or both may be coated with wavelength filtering or/and anti-reflection film. The light guide 202 may be doped with color to achieve certain spectral characteristics. The light source 204 may be an LED that emits a single color or several colors. Thus the light guide 202 efficiently mixes different colors when the light source emits several colors. For example, a 4-chip LED comprising a red, a green, a blue and a white chip may be mixed into white light of a different color temperature by the light guide 202. By the free form surface 224, the light guide 202 wastes no light when the receiver surface is circular. Thus about 20% more light is delivered to the receiver in the case of the light guide 202 serving as an interface in the case of the components in FIG. 1A. Correspondingly, the entirety of the light receiver is used in the case of the light guide 202 serving as an interface in the case of the components in FIG. 1B.

Figure 4B:
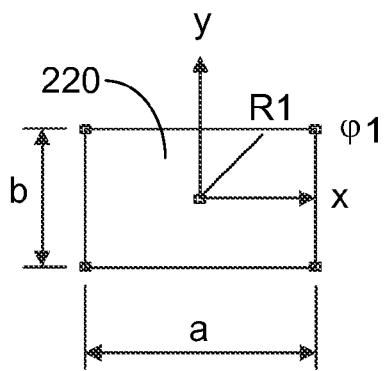
Figure 4C:
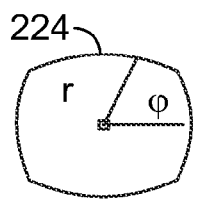
Figure 4D:
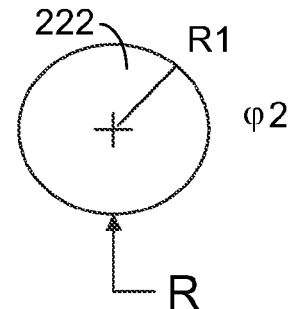

FIGS. 4A-4D show the various dimensions of the light guide 202 in FIGS. 2-3. FIG. 4A shows the dimensions of the cross section of light guide. FIG. 4B shows the dimensions of the rectangular end surface 220. FIG. 4C shows the dimensions of the free formed surface 224 along the line 4A-4A' of FIG. 4A. FIG. 4D shows the dimensions of the circular end surface 222.

The free formed surface 224 connecting the rectangular surface 220 and the circular surface 222 may be expressed in following formula. For the rectangular end surface 220 of the light guide 202 with length a and width b as shown in FIG. 4B, any points on this end may be expressed in cylindrical coordinates as ($\phi1$, r1, z1), where $$\begin{cases} \varphi 1 = (-\arctan(b/a), \arctan(b/a)) \vee (\pi - \arctan(b/a), \\ \quad \pi + \arctan(b/a)) \\ r1 = \dfrac{a}{|2\cos\varphi|} \\ z1 = 0 \end{cases} \quad (4\text{-}1)$$

or $$\begin{cases} \varphi 1 = (\arctan(b/a), \pi - \arctan(b/a)) \vee (\pi + \arctan(b/a), \\ \quad -\arctan(b/a)) \\ r1 = \dfrac{a}{|2\sin\varphi|} \\ z1 = 0 \end{cases} \quad (4\text{-}2)$$

The rectangle is divided into four sections.

For the circular end surface 222 of the light guide 202 with radius R, any points on the circular end surface 222 may be expressed as ($\phi2$, r2, z2), where $$\begin{cases} \varphi 2 = (0, 2\pi) \\ r2 = R \\ z2 = L \end{cases} \quad (4\text{-}3)$$

Along the length (axis Z), the free formed surface 224 is a collection of points P=($\phi$, r, z). Since the radius, r, gradually changes from r1 to r2 relative to z as shown in FIG. 4A, r can be derived from r1, r2 and z. Thus point P can be expressed as $$\begin{cases} \varphi = (0, 2\pi) \\ r = \dfrac{(r1)(L-z) + (r2)(z)}{L} \\ z = (0, L) \end{cases} \quad (4\text{-}4)$$

Replacing r1, r2 with previous equations (4-1), (4-2), (4-3), leads to $$\begin{cases} \varphi = (-\arctan(b/a), \arctan(b/a)) \vee (\pi - \arctan(b/a), \\ \quad \pi + \arctan(b/a)) \\ r = \dfrac{a(L-z) + |2\cos\varphi|(R-z)}{|2\cos\varphi|L} \\ z = (0, L) \end{cases} \quad (4\text{-}5)$$

or

-continued $$\begin{cases} \varphi = (\arctan(b/a), \pi - \arctan(b/a)) \vee (\pi + \arctan(b/a), \\ \quad -\arctan(b/a)) \\ r = \dfrac{a(L-z) + |2\sin\varphi|(R-z)}{|2\sin\varphi|L} \\ z = (0, L) \end{cases} \quad (4\text{-}6)$$

The free-formed surface 224 is fully defined by the parameters a, b, R, L. At an arbitrary position z along the length, the section of the light guide 202 looks like something between a rectangle and a circle as shown in FIG. 4C.

Alternatively, the rectangular end can be a square shape. The equations (4-1) and (4-2) become:

$$\begin{cases} \varphi 1 = (-45°, 45°) \vee (135°, 225°) \\ r1 = \dfrac{a}{|2\cos\varphi|} \\ z1 = 0 \end{cases} \quad (4\text{-}7)$$

or $$\begin{cases} \varphi 1 = (45°, 135°) \vee (225°, -45°) \\ r1 = \dfrac{a}{|2\sin\varphi|} \\ z1 = 0 \end{cases} \quad (4\text{-}8)$$

The square is equally divided into four sections.

Figure 5:
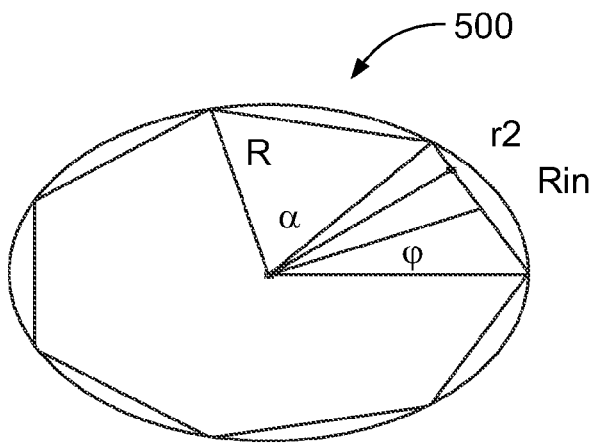
FIG. 5 is a front view of an alternative polygonal shaped end of a light guide.

Sometimes, a light guide of a circular end is not feasible to manufacture, so a regular polygon shape 500 as shown in FIG. 5 may be in place to approximate the circle. Still in the cylindrical coordinate, the regular polygon 500 of N sides circumscribed by a circle of radius R may be expressed as:

$$\begin{cases} \varphi 2 = (0, 2\pi) \\ r2 = \dfrac{R_{in}}{|\cos(\varphi - (n-1)\alpha)|} \text{ or } \dfrac{R_{in}}{|\cos(\varphi - (n-1)\alpha - \alpha/2)|}, \\ n = 1, 2, 3 \ldots N \\ z2 = L \end{cases} \quad (4\text{-}9)$$

Where $$\begin{cases} R_{in} = \dfrac{R}{\cos(\alpha/2)} \\ \alpha = 4\pi/N \end{cases} \quad (4\text{-}10)$$

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A light guide for interfacing a light source having a light emitting surface having a first shape and a light receiver having a light receiving surface of a second shape, the light guide comprising:
    a light receiving end having a first shape of substantially the same size as the first shape of the light emitting surface;
    a light emitting end having a second shape of substantially the same size as the second shape of the light receiving surface; and
    a free form body connecting the light emitting end and the light receiving end having a shape transitioning between the first shape of the light receiving end and the second shape of the light emitting end,
    wherein the first shape of the light receiving end is a different shape than the second shape of the light emitting end, and
    wherein the free form body is configured so that when light enters the light receiving end from the light source, the light bounces between surfaces of the free form body due to total internal reflection and exits the light emitting end.

2. The light guide of claim 1, wherein the first shape of the light receiving end is a rectangle and the second shape of the light emitting end is a circle.

3. The light guide of claim 1, wherein the first shape of the light receiving end is a square.

4. The light guide of claim 1, wherein the second shape of the light emitting end is a polygon.

5. The light guide of claim 1, wherein the light source is an LED package.

6. The light guide of claim 1, wherein the light guide is fabricated from one of glass, quartz, polymeric material or fused fiber.

7. The light guide of claim 1, wherein at least one of the light receiving end or the light emitting end is coated with anti-reflection film or a wavelength filter.

8. The light guide of claim 1, wherein the light source has multiple colors.

9. The light guide of claim 1, wherein the light guide is doped with color to achieve spectral characteristics.

10. A method of producing a light guide to interface a light source having a light emitting surface having a first shape with a light receiver having a light receiving surface of a second shape, comprising:
    forming a light receiving end of the light guide having a first shape of substantially the same size as the first shape of the light emitting surface;
    forming a light emitting end of the light guide having a second shape of substantially the same size as the second shape of the light receiving surface; and
    forming a free form body connecting the light emitting end and the light receiving end having a shape transitioning between the first shape of the light receiving end and the second shape of the lighting emitting end,
    wherein the first shape of the light receiving end is a different shape than the second shape of the light emitting end, and
    wherein the free form body is configured so that when light enters the light receiving end from the light source, the light bounces between surfaces of the free form body due to total internal reflection and exits the light emitting end.

11. The method of claim 10, wherein the first shape of the light receiving end is a rectangle and the second shape of the light emitting end is a circle.

12. The method of claim 10, wherein the first shape of the light receiving end is a square.

13. The method of claim 10, wherein the second shape of the light emitting end is a polygon.

14. The method of claim 10, wherein the light source is an LED package.

15. The method of claim 10, wherein the light guide is fabricated from one of glass, quartz, polymeric material or fused fiber.

16. The method of claim 10, further comprising:
coating at least one of the light receiving end or the light emitting end with anti-reflection film or a wavelength filter.

17. The method of claim 10, wherein the light source has multiple colors.

18. The method of claim 10, wherein the light guide is doped with color to achieve spectral characteristics.

19. The light guide of claim 1, wherein the free form body has a thickness that changes at a substantially constant rate from the light receiving end to the light emitting end.

20. The light guide of claim 1, wherein points on the free form body can be expressed in cylindrical coordinates $(\phi, r, z)$ as:

$$\begin{cases} \varphi = (-\arctan(b/a), \arctan(b/a)) \vee (\pi - \arctan(b/a), \pi + \arctan(b/a)) \\ r = \dfrac{a(L-z) + |2\cos\varphi|(R-z)}{|2\cos\varphi|L} \\ z = (0, L) \end{cases}$$

or $$\begin{cases} \varphi = (\arctan(b/a), \pi - \arctan(b/a)) \vee (\pi + \arctan(b/a), -\arctan(b/a)) \\ r = \dfrac{a(L-z) + |2\sin\varphi|(R-z)}{|2\sin\varphi|L} \\ z = (0, L) \end{cases}$$

wherein, for each point along the free form body, "$\phi$" represents an angle for that point from a fixed plane, "r" represents a distance of that point from a central axis of the light guide, and "z" represents a position along a length L of the light guide, and wherein "a" is a length of the second surface, "b" is a width of the second surface, "R" is a radius associated with the first surface, and "L" is the length of the light guide.

21. The method of claim 10, wherein the free form body has a thickness that changes at a substantially constant rate from the light receiving end to the light emitting end.

22. The method of claim 10, wherein points on the free form body can be expressed in cylindrical coordinates $(\phi, r, z)$ as:

$$\begin{cases} \varphi = (-\arctan(b/a), \arctan(b/a)) \vee (\pi - \arctan(b/a), \pi + \arctan(b/a)) \\ r = \dfrac{a(L-z) + |2\cos\varphi|(R-z)}{|2\cos\varphi|L} \\ z = (0, L) \end{cases}$$

or $$\begin{cases} \varphi = (\arctan(b/a), \pi - \arctan(b/a)) \vee (\pi + \arctan(b/a), -\arctan(b/a)) \\ r = \dfrac{a(L-z) + |2\sin\varphi|(R-z)}{|2\sin\varphi|L} \\ z = (0, L) \end{cases}$$

wherein, for each point along the free form body, "$\phi$" represents an angle for that point from a fixed plane, "r" represents a distance of that point from a central axis of the light guide, and "z" represents a position along a length L of the light guide, and wherein "a" is a length of the second surface, "b" is a width of the second surface, "R" is a radius associated with the first surface, and "L" is the length of the light guide.

\* \* \* \* \*